(12) United States Patent
Wilson et al.

(10) Patent No.: US 10,859,202 B2
(45) Date of Patent: Dec. 8, 2020

(54) COUPLER FOR RELEASABLY SECURING INTEGRATED SEGMENTS OF AN ASSEMBLAGE AGAINST OTHERWISE ACCOMMODATED RELATIVE TRANSLATIONAL DISPLACEMENT

(71) Applicant: Zuby, LLC, Boulder, CO (US)

(72) Inventors: David S. Wilson, Fort Collins, CO (US); David Wilson, Jr., Fort Collins, CO (US)

(73) Assignee: Zuby, LLC, Boulder, CO (US)

( * ) Notice: Subject to any disclaimer, the term of this patent is extended or adjusted under 35 U.S.C. 154(b) by 634 days.

(21) Appl. No.: 15/732,040

(22) Filed: Sep. 8, 2017

(65) Prior Publication Data

US 2019/0078728 A1    Mar. 14, 2019

(51) Int. Cl.
*F16M 11/32* (2006.01)
*F16B 7/14* (2006.01)
*F16B 7/16* (2006.01)

(52) U.S. Cl.
CPC .......... *F16M 11/32* (2013.01); *F16B 7/1463* (2013.01); *F16B 7/14* (2013.01); *F16B 2007/16* (2013.01)

(58) Field of Classification Search
CPC ......... F16M 11/32; F16B 7/1463; F16B 7/14; F16B 2007/16
See application file for complete search history.

(56) References Cited

U.S. PATENT DOCUMENTS

| | | | | |
|---|---|---|---|---|
| 625,020 | A * | 5/1899 | Chappuis | F16B 7/04 403/59 |
| 695,528 | A * | 3/1902 | Beckley | G01C 15/06 33/293 |
| 1,818,977 | A * | 8/1931 | Gray | E05C 17/30 292/275 |
| 1,918,519 | A * | 7/1933 | Clements | A47L 9/325 403/66 |
| 2,455,525 | A * | 12/1948 | Schulz | F16B 7/149 248/188.5 |
| 2,503,738 | A * | 4/1950 | Horton | E04G 25/08 403/362 |
| 2,694,542 | A * | 11/1954 | Barbakoff | F16M 11/32 248/168 |
| 2,817,548 | A * | 12/1957 | Uthemann | A45B 23/00 403/104 |
| 2,849,249 | A * | 8/1958 | Fridolph | F16B 7/1454 403/376 |
| 2,957,187 | A * | 10/1960 | Raia | A61G 7/0503 5/503.1 |
| 3,453,011 | A * | 7/1969 | Meinunger | F16B 7/1472 403/104 |
| 3,589,757 | A * | 6/1971 | Mooney | F16M 11/32 403/105 |
| 3,697,103 | A * | 10/1972 | Mostyn | F16B 1/00 403/104 |

(Continued)

*Primary Examiner* — Anita M King
(74) *Attorney, Agent, or Firm* — Harold A. Burdick

(57) ABSTRACT

Apparatus are disclosed for coupling integrated segments of an assemblage. The coupler apparatus includes a carrier connectable to one segment and slidably receiving another segment and has an elongate slot defined at one wall portion of a cavity therein. A restraint includes a conic wedge receivable in the carrier and has an actuator arm angularly extending from the wedge that is receivable through the elongate slot of the carrier.

20 Claims, 20 Drawing Sheets

(56) References Cited

U.S. PATENT DOCUMENTS

| | | | | | |
|---|---|---|---|---|---|
| 4,029,279 | A | * | 6/1977 | Nakatani | F16B 7/1454 |
| | | | | | 248/188.5 |
| 4,185,936 | A | * | 1/1980 | Takahashi | F16B 7/1454 |
| | | | | | 16/DIG. 39 |
| 4,277,197 | A | * | 7/1981 | Bingham | B25G 1/04 |
| | | | | | 403/104 |
| 4,706,916 | A | * | 11/1987 | Cullmann | F16B 7/1463 |
| | | | | | 248/168 |
| 4,744,690 | A | * | 5/1988 | Hsieh | F16B 7/1418 |
| | | | | | 248/411 |
| 4,932,622 | A | * | 6/1990 | Hayakawa | F16B 7/1454 |
| | | | | | 248/188.5 |
| 5,548,873 | A | * | 8/1996 | Macias | F16G 11/106 |
| | | | | | 24/115 G |
| 2018/0371773 | A1 | * | 12/2018 | Klein | E04G 25/063 |

* cited by examiner

COUPLER FOR RELEASABLY SECURING INTEGRATED SEGMENTS OF AN ASSEMBLAGE AGAINST OTHERWISE ACCOMMODATED RELATIVE TRANSLATIONAL DISPLACEMENT

FIELD OF THE INVENTION

This invention relates to mechanical couplers and, more particularly, relates to couplers for releasably securing integrated units (such as telescoping segments) from relative translatory motion in at least one direction.

BACKGROUND OF THE INVENTION

A variety of applications for assemblages having segments capable of relative movement for coupling the segments and/or for accommodating adjustment of a dimension of the assemblage (such as length) are well known and widely utilized. Examples of such assemblages include telescoping tube, rod and/or cylinder segments for setting specific length extensions of the assemblage from a stored association of the segments. Typical applications include adjustable legs for bipods and tripods, easels, light stands, hospital bed stands, tables, bicycle posts and mounting tubes, strain reliefs for cable and fiber optics, and a large variety of other such applications. Another example of such assemblages includes a host of known coupling systems for tube, conduit or hose end segments where the ends are butted together and secured.

All such applications require use of mechanisms for coupling the segments and securing them once the desired relative position of the segments is attained. Examples of these mechanisms include clamping couplers (see U.S. Pat. Nos. 625,020, 695,528, 1,918,519, 2,817,548, and 2,849,249), friction surface actuated couplers (see U.S. Pat. Nos. 2,503,738, 3,453,011, 3,589,757, 4,185,936, and 5,548,873), projection and detent couplers (see U.S. Pat. Nos. 2,957,187, 3,697,103, and 4,029,279), and cone or bushing type couplers employing various means of engagement (threaded connectors for example) and actuation (for example springs, levers or the like; see U.S. Pat. Nos. 1,818,977, 2,455,525, 2,694,542, 4,277,197, and 4,706,916).

Heretofore known couplers, while in use in various applications, have certain limitations not found desirable for modern-day applications where simple to use and light-weight yet strong, durable and reliable mechanisms are preferred. For example, telescoping couplers are often limited in weight bearing capacity without joint slippage at couplers, and or often heavy due to the use of threaded fasteners or components with ferrules or collets used as a compression coupler. Threaded fastener used in many couplers present a recurring frustration for users where repeated tightening and loosening is required during use, the strength of the user thus being a factor and the process being time consuming, and where rapid wear of such couplers shortens the useful life thereof. Heretofore known couplers are also overly complex and expensive to produce (and thus replace) and often require separate actuators or fasteners for coupler use. Further improvement could thus be utilized.

SUMMARY OF THE INVENTION

This invention provides a coupling apparatus for releasably securing integrated segments of an assemblage. The coupler apparatus is characterized by design simplicity (including only a carrier and a restraining wedge for releasably securing the integrated segments of the assemblage), is thus less expensive to produce, and requires no secondary mechanisms or hardware in use to achieve segment position retention. The apparatus is simple to use and is light-weight yet strong, durable and reliable even where use requires numerous repeated engagements and releases of the coupler over the product life cycle of the assemblage. The coupler of this invention is particularly well adapted for use with telescoping segments of an assemblage to improved weight bearing capacity of the integrated segments without segment joint slippage.

The coupling apparatus of this invention adapted for releasably securing first and second segments of an assemblage against otherwise accommodated relative translational displacement includes a carrier and a wedge, the carrier connectable at the first segment at one end thereof and having a passageway defined at the one end accommodating receipt therethrough of the second segment. The carrier is characterized by an enlarged cavity open at an opposite end of the carrier and with the passageway opening thereinto. The cavity has first and second wall portions (preferably radially configured), the first wall portion extending adjacent one side of the passageway and axially (or linearly) aligned with the passageway (at one side thereof).

The second wall portion is spaced from the first wall portion and from the passageway and has an elongate opening defined therethrough opposite the first wall portion. The elongate opening is preferably a slot having an inwardly facing opening of a first length and an outwardly facing opening longer than the first length adjacent to the one end. An arcuate guide surface is defined between the openings.

The wedge has an outer surface configured for slidable engagement at the second wall portion of the cavity of the carrier, and has an inner surface configured for selective engagement with the second segment. An arm angularly extends from the outer surface of the wedge and is receivable through the elongate opening through the second wall portion of the cavity of the carrier and is slidable therein.

The coupler of this invention is particularly suitable for coupling integrated first and second segments of an assemblage wherein each segment has an end portion engagable with one another to releasably secure the segments against relative movement therebetween in at least one axial direction (in the case of telescoping segments, the end portions are typically cylindrical, though variations do exist and can be accommodated by this invention). The wedge operates as a restraint, the inner surface thereof having a radial configuration adapted for frictional engagement with the second segment. The inner and outer surfaces of the restraint together define a conic wedge with upper and lower ends. The arm functions in part as an actuatable means and extends from the outer surface at the lower end of the restraint. The arm has a first part slidable in the cavity when assembled and a second part spaced from the conic wedge and angularly extending from the first part to contact and engage the guide surface of the elongate slot, the second part readily accessible to a user for manipulation of the segments.

In the case where the carrier's cavity wall portions are radially configured and the passageway is cylindrical, the first radial wall portion is axially aligned at a juncture with the cylindrical passageway and has a common radius at the juncture with the cylindrical passageway. The second radial wall portion in the cavity has a radius longer than the first wall portion. The outer surface of the conic wedge of the restraint may preferably be defined by plural outer surfaces circumferentially defined around the restraint thereat.

By controlling differential friction it is possible to eliminate secondary parts such as springs, collars and fully encircling components or secondary machining. By careful selection of geometrical interrelationships between the two parts of the coupler of this invention, and the use of caming interactions, part nesting, and pathway motion guidance, fasteners and various other parts can be eliminated while still increasing coupling performance including weight bearing capacity. Moreover, the coupler automatically grips and simultaneously compresses a segment moved in a first axial direction relative to the other integrated segment of the assemblage and automatically releases that same segment when moved in the opposite relative axial direction. User manipulation of the arm overrides these features, allowing the captured segment to be freely repositioned in either direction.

It is therefore an object of this invention to provide an improved coupler apparatus for releasably securing integrated segments of an assemblage.

It is another object of this invention to provide a coupling apparatus that includes only a carrier and a restraining wedge for releasably securing integrated segments of an assemblage.

It is still another object of this invention to provide a coupler apparatus that simple to use and light-weight, yet strong, durable and reliable over many repeated applications.

It is yet another object of this invention to provide a coupling apparatus for telescoping assemblages that has improved weight bearing capacity without assemblage or coupler slippage.

It is still another object of this invention to provide a coupler apparatus for releasably securing integrated segments of an assemblage that has simple design, is less expensive to produce, and requires no secondary mechanisms to achieve retention of the integrated assemblage segments.

It is another object of this invention to provide a coupler for releasably securing first and second segments of an assemblage against otherwise accommodated relative translational displacement that includes a carrier connectable at the first segment at one end thereof and having a passageway defined at the one end accommodating receipt therethrough of the second segment, the carrier characterized by an enlarged cavity therein open at an end of the carrier opposite the one end and having the passageway opening thereinto, the cavity having first and second wall portions, the first wall portion extending adjacent one side of the passageway and axially aligned with the passageway and the second wall portion spaced from the first wall portion and the passageway with an elongate opening defined therethrough opposite the first wall portion, the second wall portion extending a distance to the opposite end, and a wedge having an outer surface configured for slidable engagement at the second wall portion of the cavity of the carrier and having an inner surface configured for selective engagement with the second segment, an arm angularly extending from the outer surface of the wedge and receivable through the elongate opening through the second wall portion of the cavity of the carrier and slidable therein.

It is still another object of this invention to provide a coupler for coupling integrated first and second segments of an assemblage, each segment having an end portion engagable with one another, the apparatus releasably securing the segments against relative movement therebetween in at least one axial direction, the coupler including a carrier connectable at one end thereof adjacent to the end portion of the first segment and having a passageway defined at the one end accommodating slidable receipt therethrough of the end portion of the second segment, the carrier characterized by an enlarged cavity therein open at an end of the carrier opposite the one end and having the passageway opening thereinto, the cavity having first and second wall portions, the first wall portion configured with a portion linearly aligned with one side of the passageway and the second wall portion spaced from the first wall portion and the passageway and having an elongate slot defined therethrough between the one end and the opposite end and opposite the first wall portion, the elongate slot having an inwardly facing opening of a first length and an outwardly facing opening longer than the first length adjacent to the opposite end, an arcuate guide surface defined therebetween adjacent to the opposite end, and a restraint having an outer surface configured for engagement at the second wall portion of the cavity of the carrier and having an inner surface adapted for frictional engagement with the second segment, the surfaces together defining a conic wedge with upper and lower ends, an actuator arm angularly extending from the outer surface at the lower end of the restraint and receivable through the elongate slot through the second wall portion of the cavity of the carrier, the arm having a first part slidable in the cavity when assembled and a second part spaced from the conic wedge and angularly extending from the first part to contact and engage the guide surface of the elongate slot, the second part readily accessible to a user for manipulation of the segments.

It is yet another object of this invention to provide an apparatus for coupling integrated first and second telescoping segments of an assemblage, each segment having a cylindrical end portion telescopingly engagable with one another, the apparatus releasably securing the segments against relative movement therebetween in one direction, the apparatus including a carrier affixable at one end thereof to the end portion of the first segment and having a cylindrical passageway at the one end accommodating slidable receipt therethrough of the end portion of the second segment, the carrier characterized by an enlarged cavity therein open at an end of the carrier opposite the one end and having the passageway opening thereinto adjacent to the one end thereof, the cavity having a first radial wall portion thereat axially aligned at a juncture with the cylindrical passageway and having a common radius at the juncture with the cylindrical passageway, the first wall portion extending a distance between the ends, a second radial wall portion located in the cavity opposite the first wall portion and having a radius longer than the first wall portion, the second wall portion extending a distance to the opposite end and having an elongate opening therethrough opposite the first wall portion, and a restraint including a conic wedge with upper and lower ends, the conic wedge having outer surfaces circumferentially defined therearound configured for slidable engagement at the second wall portion of the cavity of the carrier and having an inner surface with a selected radial configuration, the restraint including an actuator arm angularly extending from the outer surface at the lower end of the conic wedge and receivable through the elongate opening through the second wall portion of the cavity of the carrier, the arm having a first part slidable in the cavity when assembled and a second part spaced from the conic wedge and angularly extending from the first part, the arm readily manipulable by a user.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
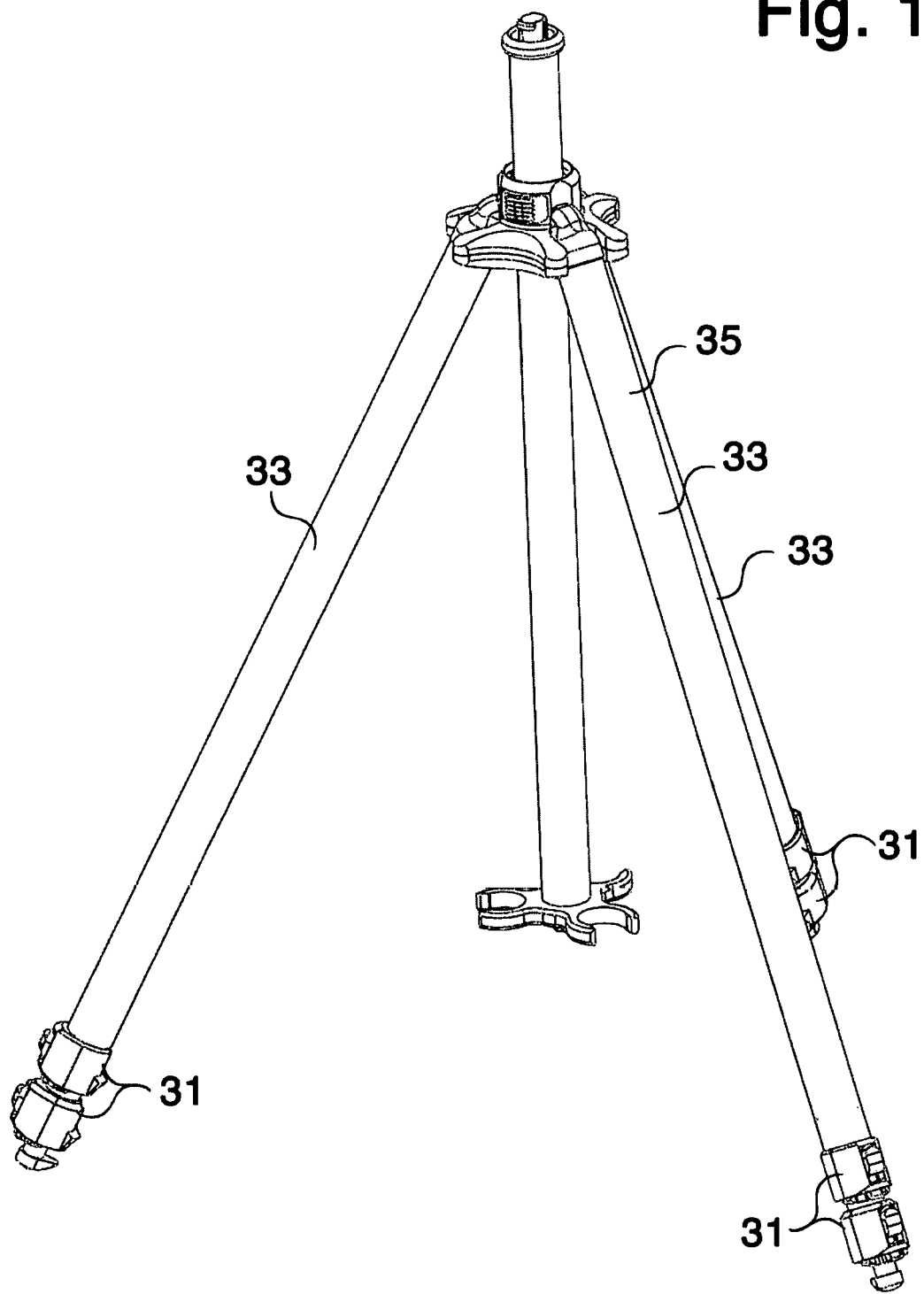
FIG. 1 is a perspective view of a tripod utilizing couplers of this invention.
Figure 2:
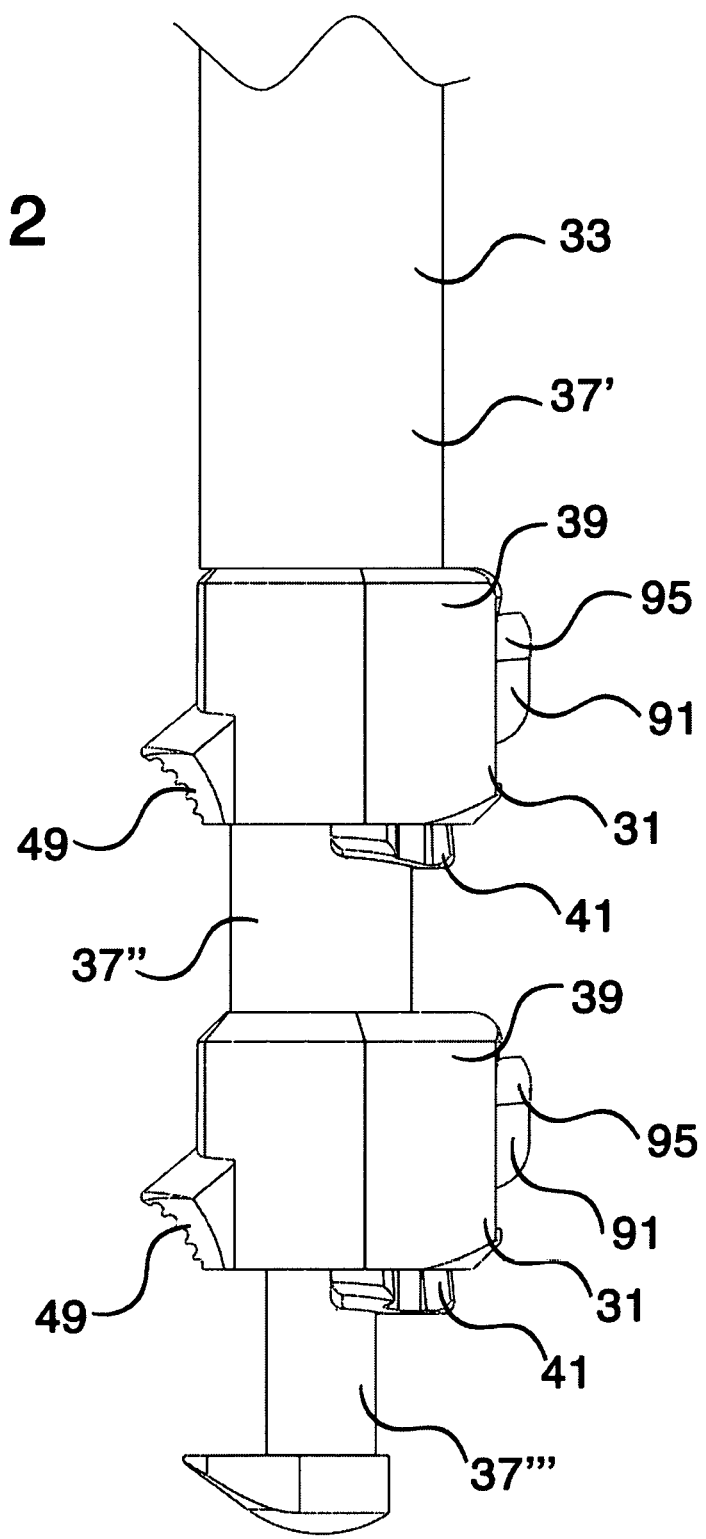
FIG. 2 is a side elevation view of the couplers shown in FIG. 1.
Figure 3:
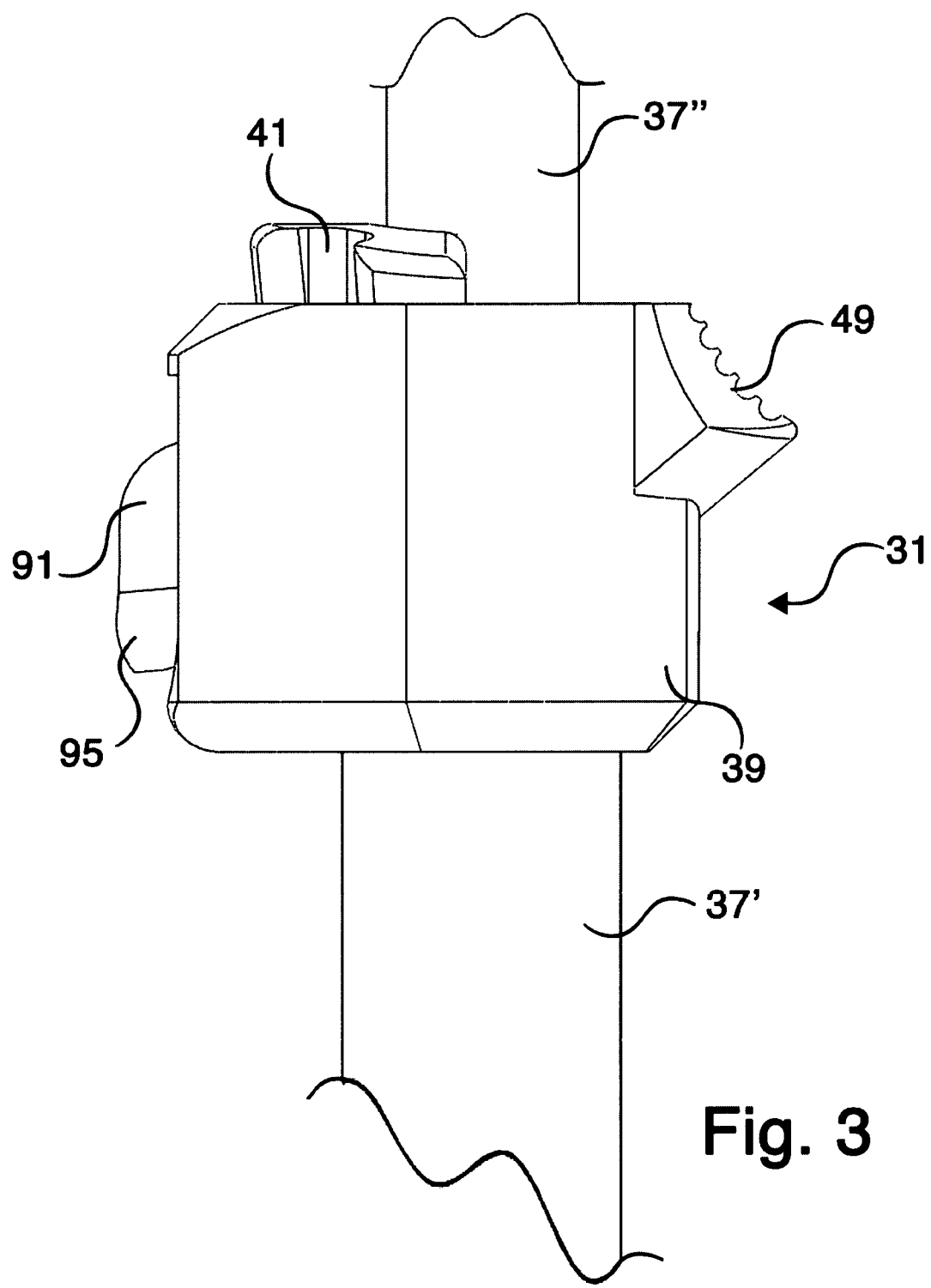
FIG. 3 is another side elevation view of the coupler of this invention.
Figure 4:
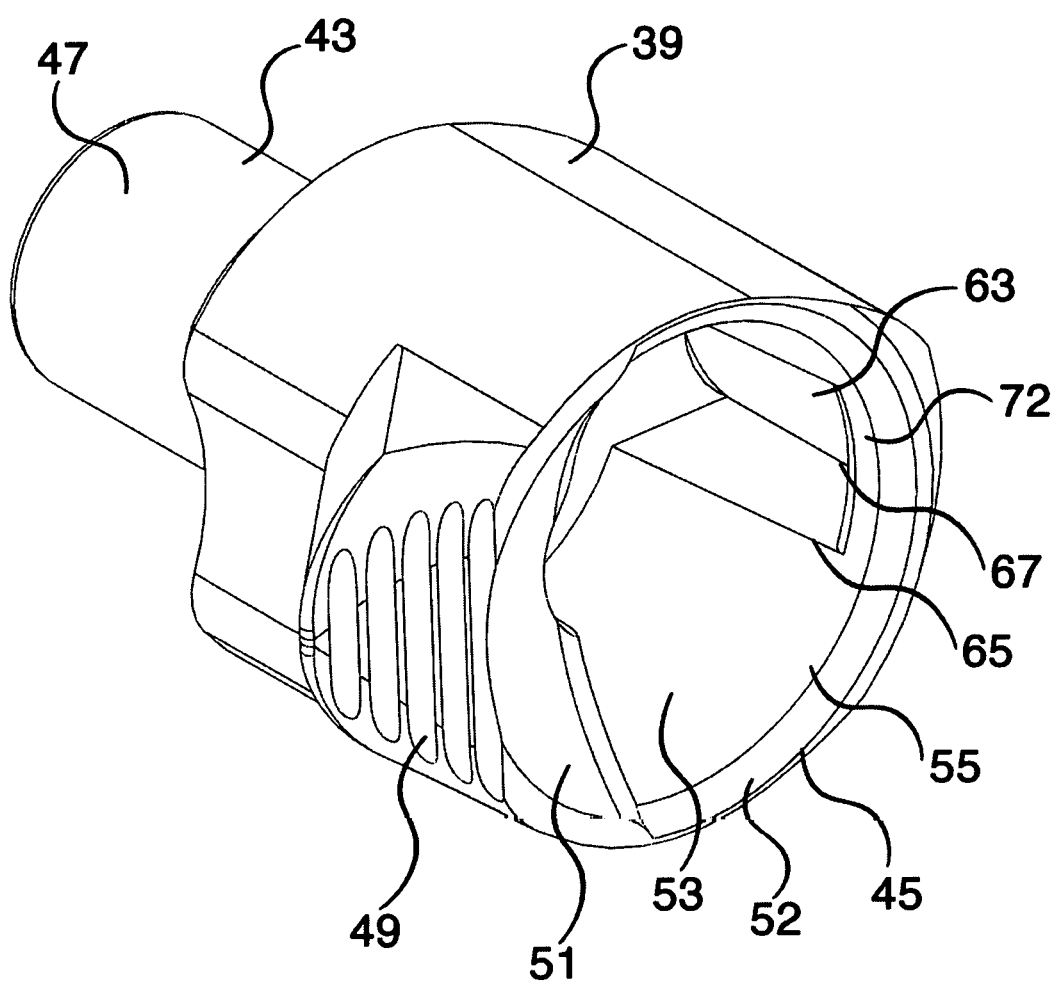
FIG. 4 is a perspective view of the carrier portion of the coupler of FIGS. 1 and 3.
Figure 5:
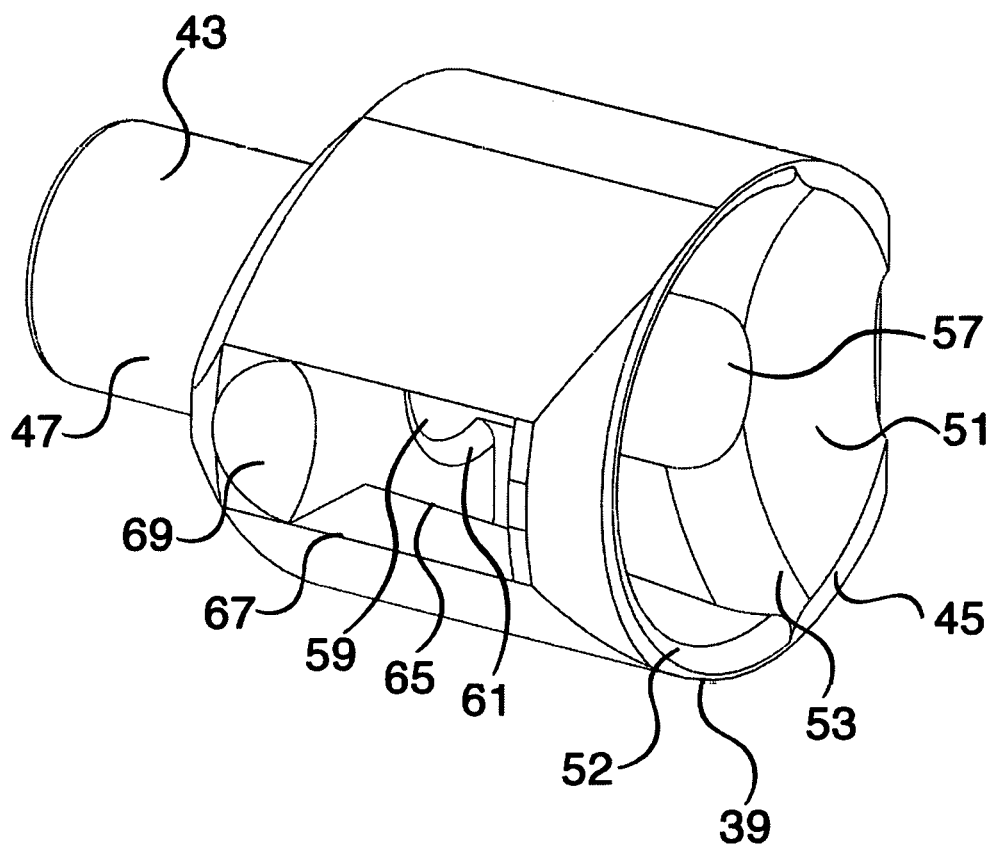
FIG. 5 is an opposite perspective view of the carrier portion of FIG. 4.
Figure 6:
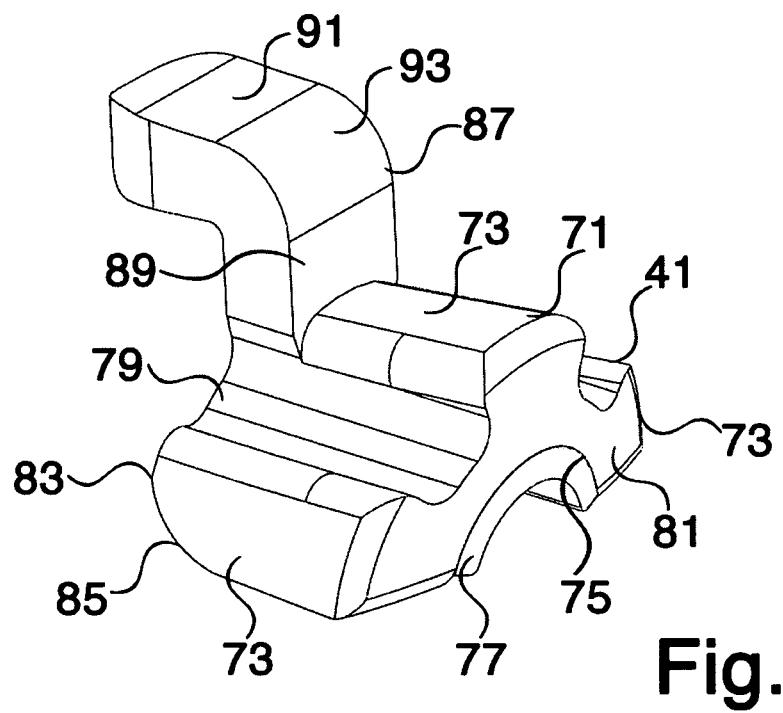
FIG. 6 is a perspective view of the locking, or wedge, portion the coupler of FIGS. 1 and 3.
Figure 7:
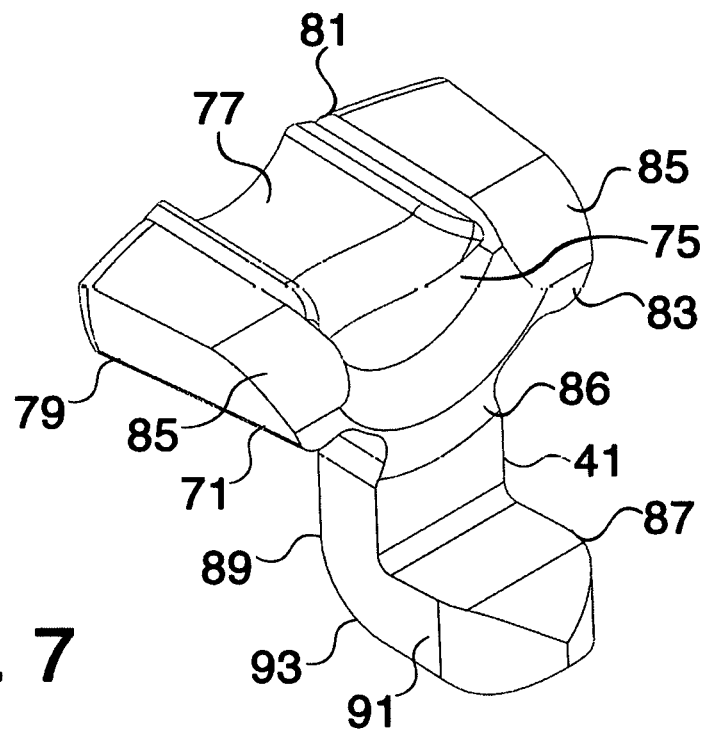
FIG. 7 is an opposite perspective view of the locking portion of FIG. 6.
Figure 8:
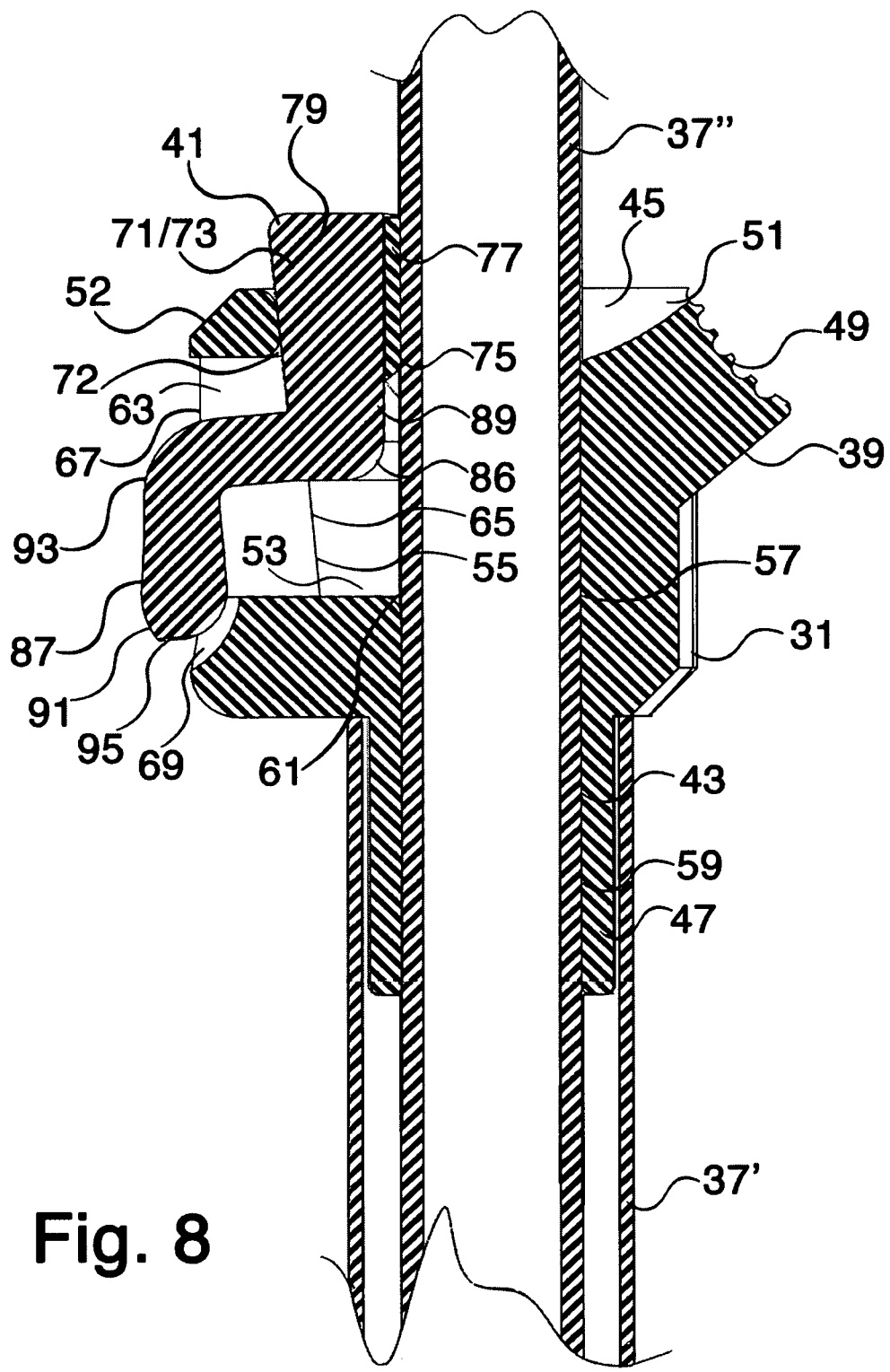
FIGS. 8 and 9 are sectional views illustrating operation of the couplers of this invention.
Figure 9:
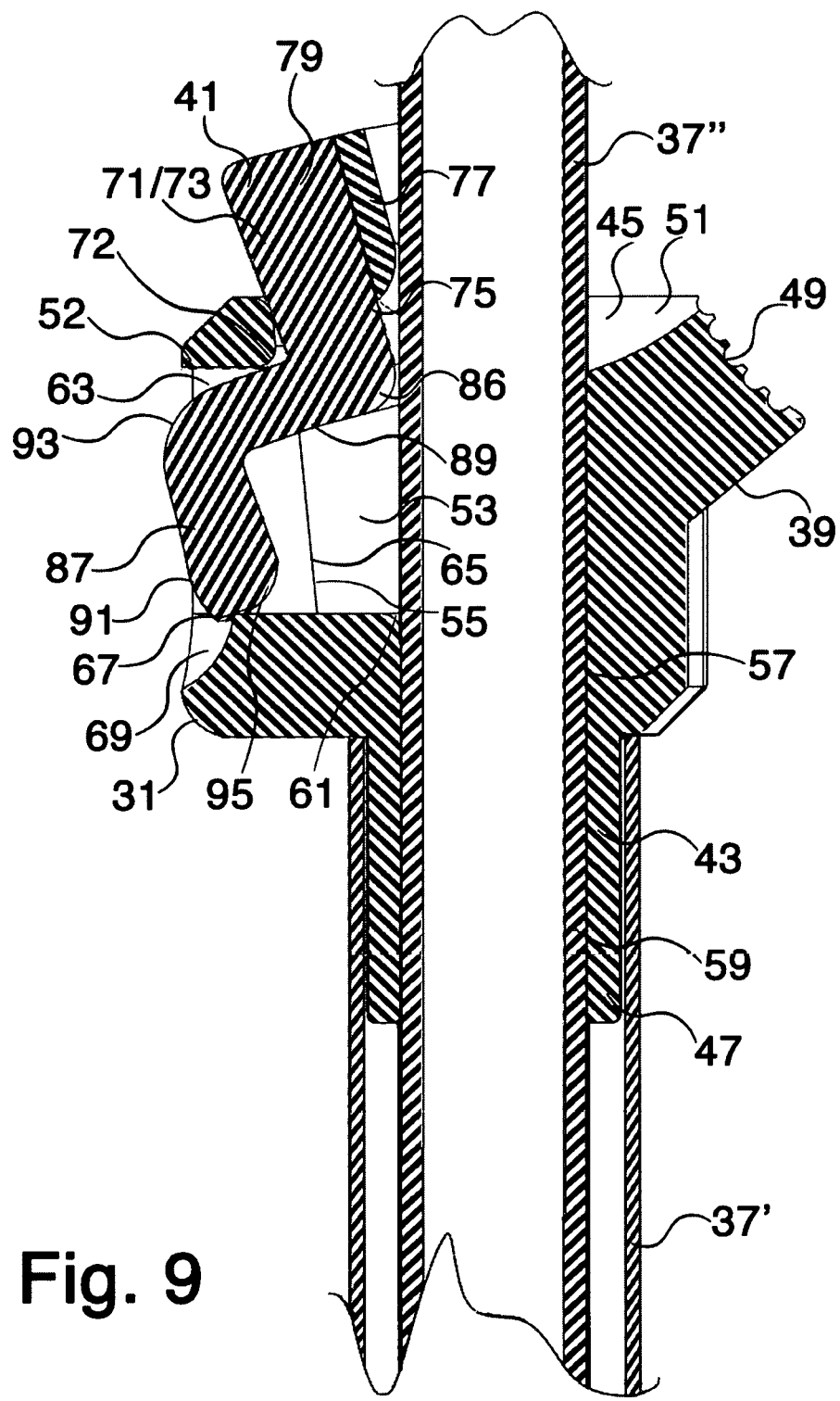

With reference to FIGS. 1 through 9, a first embodiment of coupling apparatus (or simply coupler) 31 of this invention will be described. As shown in FIG. 1, coupler 31 is deployed with telescoping leg assemblages 33 of a tripod 35 (other deployment schemes will be described hereinbelow). As seen in FIGS. 2 and 3, telescoping legs 33 include plural leg segments 37', 37" and 37''' telescopingly housed one in the next (a plurality of legs of any number are used depending upon the product and its use, coupler 31 variously sized and configured to accommodate any telescoping leg segment pair).

Coupler 31 includes carrier 39 and restraint (or wedge) 41. Carrier 39 (see FIGS. 4, 5, 8 and 9) has first and second opposite ends 43 and 45, with connecting sleeve 47 at end 43 and a protruding gripping surface 49 and inwardly tapering lip 51 at collar 52 of opposite open end 45. Internal cavity 53 is located in carrier 39 between the ends with spaced wall portions 55 and 57 at opposite sides of cavity 53. Passageway 59 (cylindrical in this embodiment) for receipt therethrough of segment 37" opens through connecting sleeve 47 into cavity 53 at end 43. Wall portion 57 extends from juncture 61 where passageway 59 enters cavity 53 and adjacent to and axially aligned with one side of passageway 59 in a linear relationship therewith. Connecting sleeve 47 is configured to be connectable with segment 37' (by compression fit, gluing or the like).

Wall portion 55 and 57 are preferably radially configured with wall portion 57 have a radius common at juncture 59 (and preferably all along wall portion 57) with the radius of cylindrical passageway 59. The defined radius of wall portion 55 is longer than that of wall portion 57, wall portion 55 spaced from the opening of passageway 59 into cavity 53. Wall portion 55 has elongate opening (preferably a slot) 63 therethrough opposite wall portion 57, elongate slot 63 having inwardly facing opening 65 and outwardly facing opening 67 with opening 67 longer adjacent end 43 than opening 65 and having arcuate guide surface 69 defined thereat between the openings. Collar fulcrum 72 is defined by the rounded surface of collar 52 adjacent to elongate slot 63 at end 45.

Restraint 41 (see FIGS. 6 through 9) has outer surface 71, preferably circumferentially defined by plural skid surfaces 73 and configured for slidable engagement at outer wall 55 of cavity 53. Inner, preferably radial, surface 75 of restraint 41 is configured to selectively engage segment 37". Surface 75 may have a frictional surface formed thereon, and is preferably fitted (by gluing, in-place molding, heat welding, or the like) with frictional (e.g., semi-pliant substrate) surface 77 for frictional engagement with and response to movement by segment 37". Surfaces 71 and 75 together define a conic, semi-arcuate wedge 79 therebetween having upper and lower ends 81 and 83, respectively, sloped shoulders 85 located at end 83 and rounded shoulder 86 at the bottom of surface 75.

Actuation guide and override arm 87 angularly extends from outer surface 71 at lower end 83 and includes first arm part 89 and second arm part 91 angularly extending from the first part at arcuate rounded intersection surface 93 so that arm part 93 is spaced from conic wedge 79. Beveled arm tail 95 is formed at the end of second arm part 91. When assembled, arm 87 is received through elongate slot 63 with first part 91 slidable therein and with second part positioned for contact and engagement at guide surface 69 of elongate slot 63 thereby to bias conic wedge 79 surface 75/77 further into engagement with segment 37" as restraint 41 is dragged further into cavity 53 by axial movement of segment 37" through carrier 39 and the frictional engagement with surface 75/77 thereat.

When fully lodged, segments 37' and 37" are thus firmly positionally fixed relative to one another. Reversing the axial direction of segment 37" movement releases segment 37" as restraint 41 is pivotably dragged back out of carrier cavity 53 via frictional engagement of segment 37" and surface 75/77 without further action on the part of a user. Should free movement of segment 37" relative to segment 37' be necessary (for example when moving leg segments into full retraction for storage) the user may hold arm part 91 in fully pivoted position by contacting arm part 91 and beveled arm tail 95 (see FIG. 9).

Figure 10:
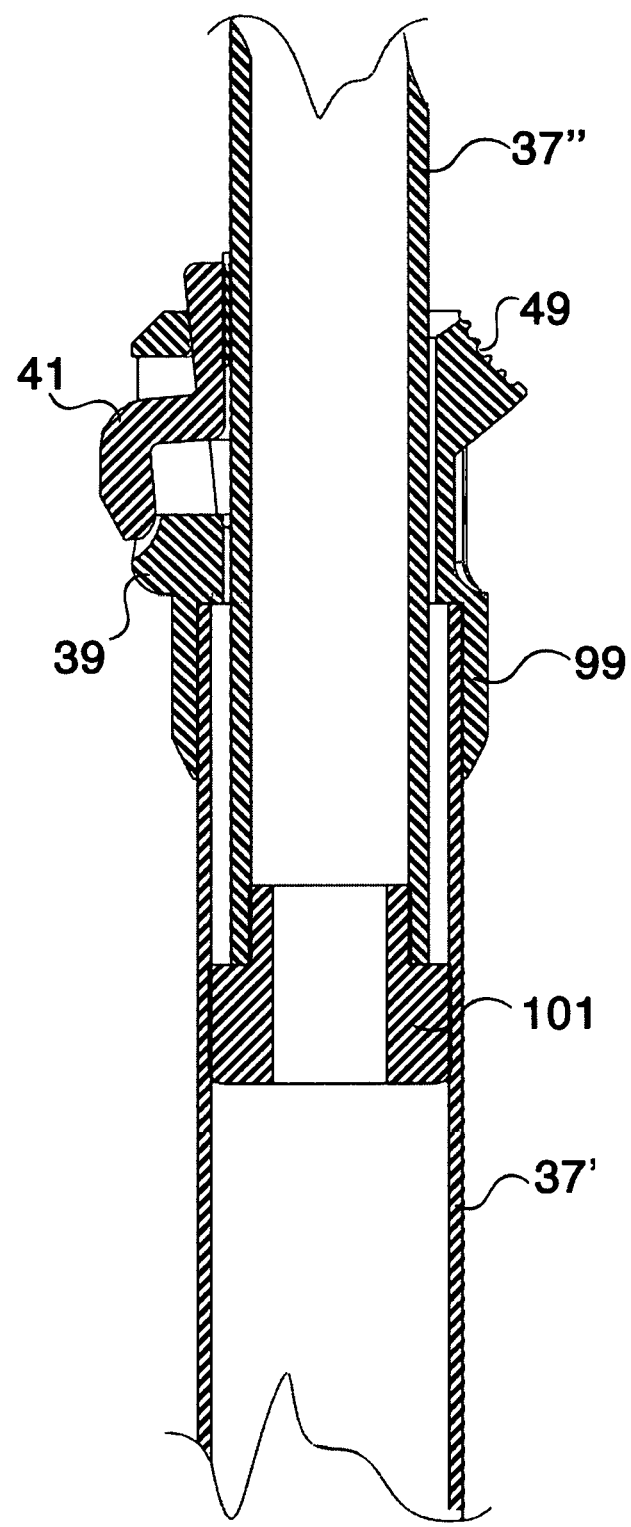
FIG. 10 is a sectional view of the coupler of this invention with a different carrier portion adaptation.

While coupler 31 has heretofore been illustrated with sleeve 47 at carrier 39 adapted for inserting and securement into segment 37' of leg assemblages 33, as shown in FIG. 10 carrier 39 sleeve 99 could as well be adapted for securement fitting over segment 37'. In this case guide plugs 101 as are known in the art can be used to stabilize segment 37" in segment 37'.

Conic engagement surfaces may be adapted at any or all of outer surface 71 of conic wedge 79, inner surface 75 of conic wedge 79 and cavity wall portions 55 and/or 57 (preferably, however, surface 71 and wall portion 55), the choices in this regard resulting in a cumulative cone angle. The larger the cumulative cone angle (for example in a 12° to 16° range), the easier the operation of the coupler is. However, this comes with a tradeoff in segments securement performance. Shallower cone angles (for example in a 2° to 4° range) result in a difficult to manipulate coupler but also increases segment securement performance. Where design consideration favor ease if use with modest securement performance the larger angles work well. In a more permanent role, where joint slip avoidance is paramount, shallower angles work best. Optimum results which balance operability and securement performance occurs in a range between about 4° and 6°. During testing of couplers of this invention using approximately a 5° cone angle superior load bearing capabilities without slipping have been realized under loads in excess of 250 lbs.

Figure 11:
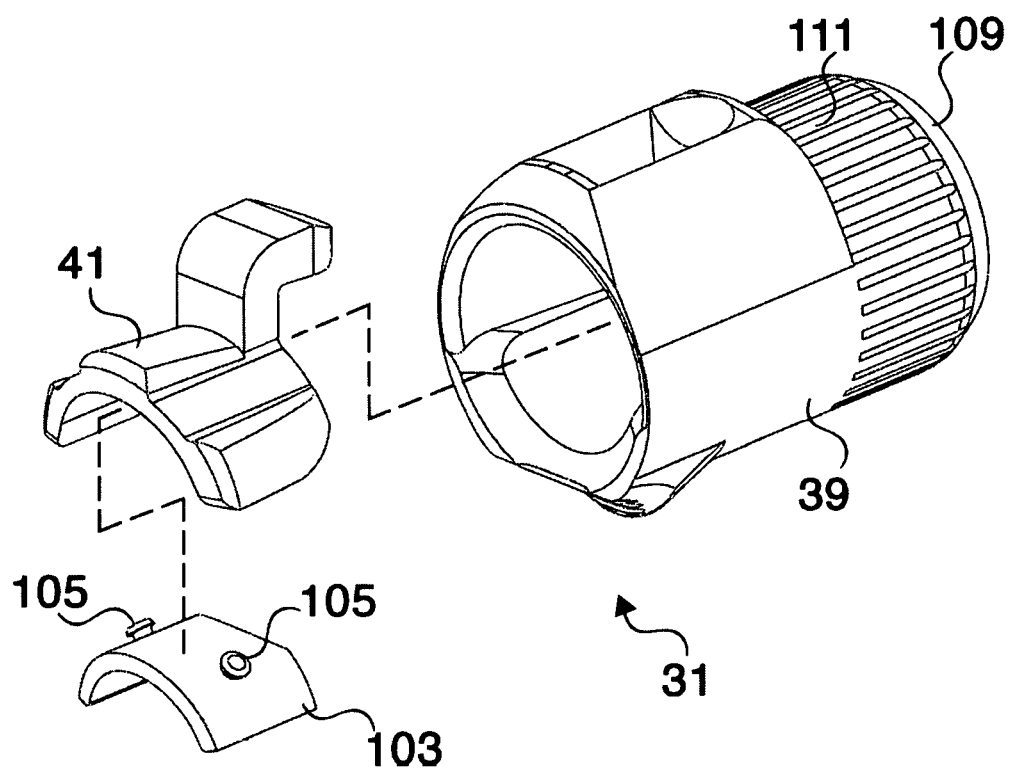
FIGS. 11 and 12 are perspective exploded views of the coupler of this invention configured to accommodate manufacture thereof from metal.
Figure 12:
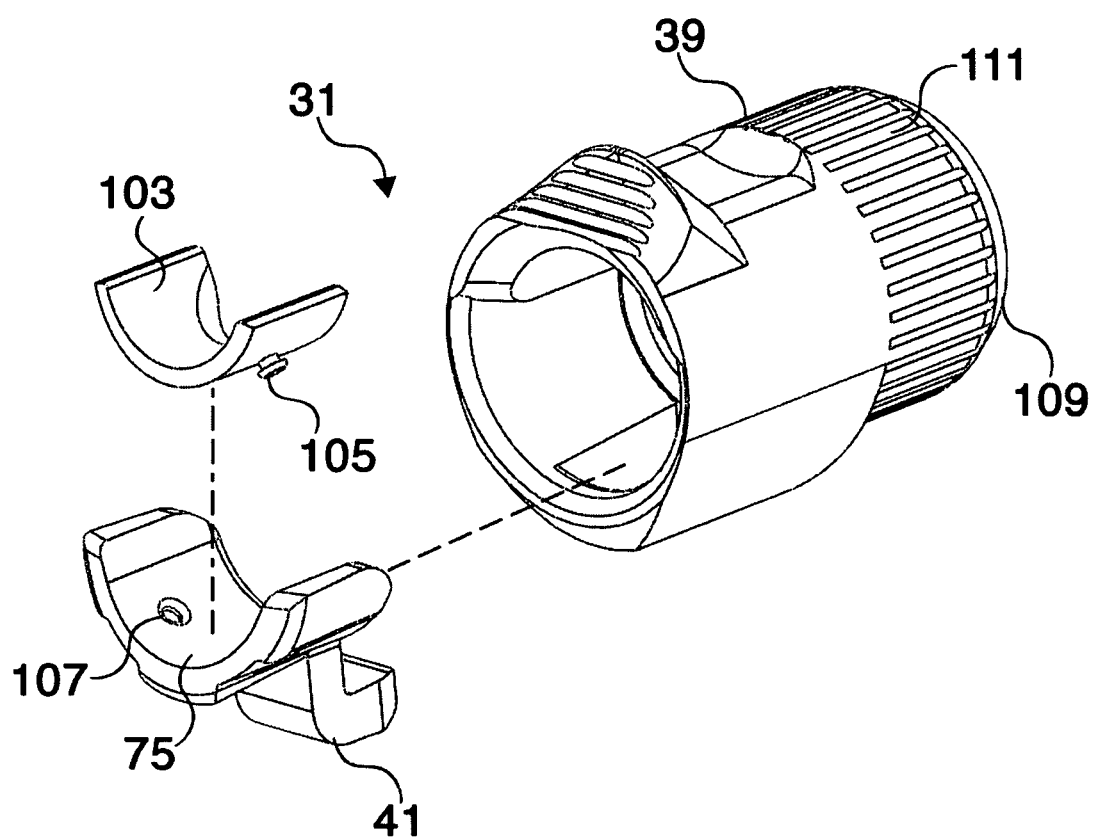

FIGS. 11 and 12 illustrate coupler 31 of this invention configured for implementations where the coupler must be fabricated from metal for one reason or another. Structurally similar in most regards, adaptations must be made to accommodate metal manufacture. For example, frictional substrate surface 103 is adapted using rivet pins 105 formed thereat and pressable into mating openings 107 through inner surface 75 of restraint 41 (two of each pins 105 and opening 107). Attachment sleeve 109 includes knurled surface 111 and may be configured as need be for the particular application (for threaded, press fit, solder joint, compression fitting applications or the like for example).

Figure 13:
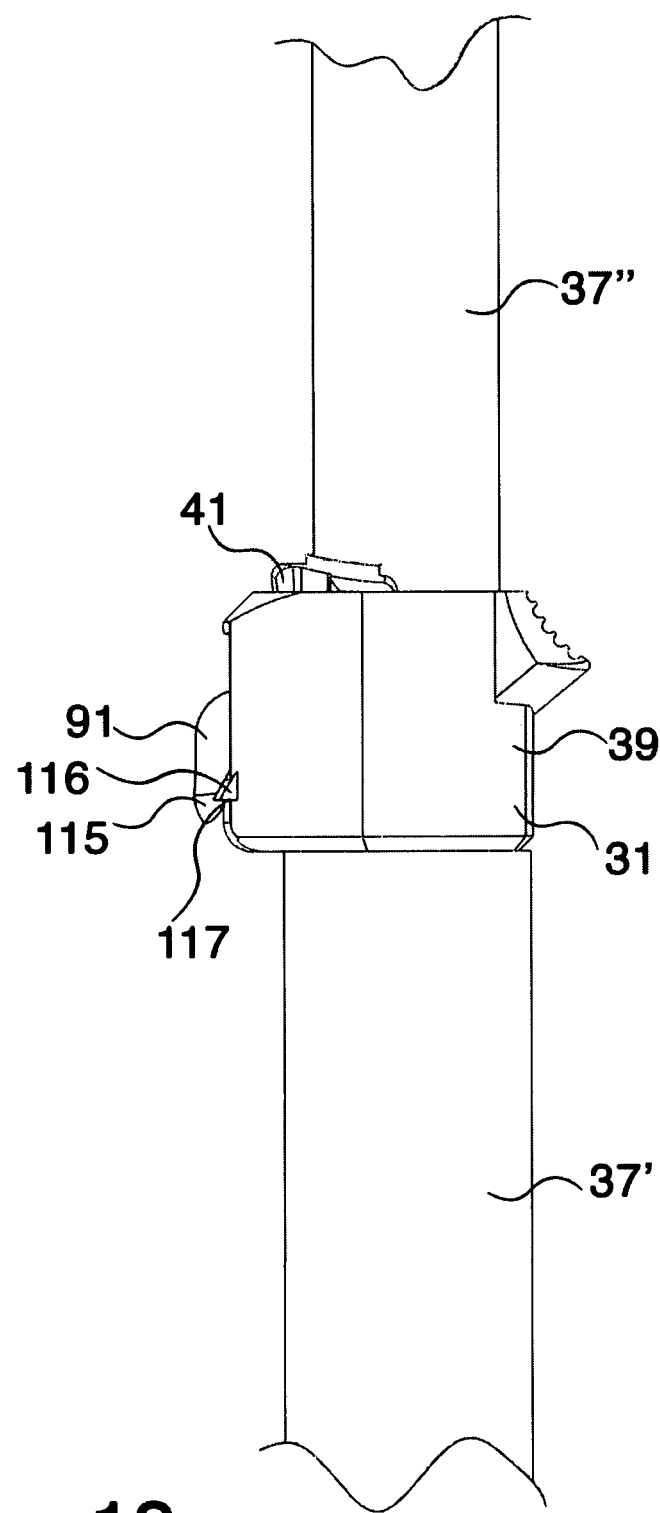
FIG. 13 is a side elevation view of an alternative embodiment of the coupler of this invention.
Figure 14:
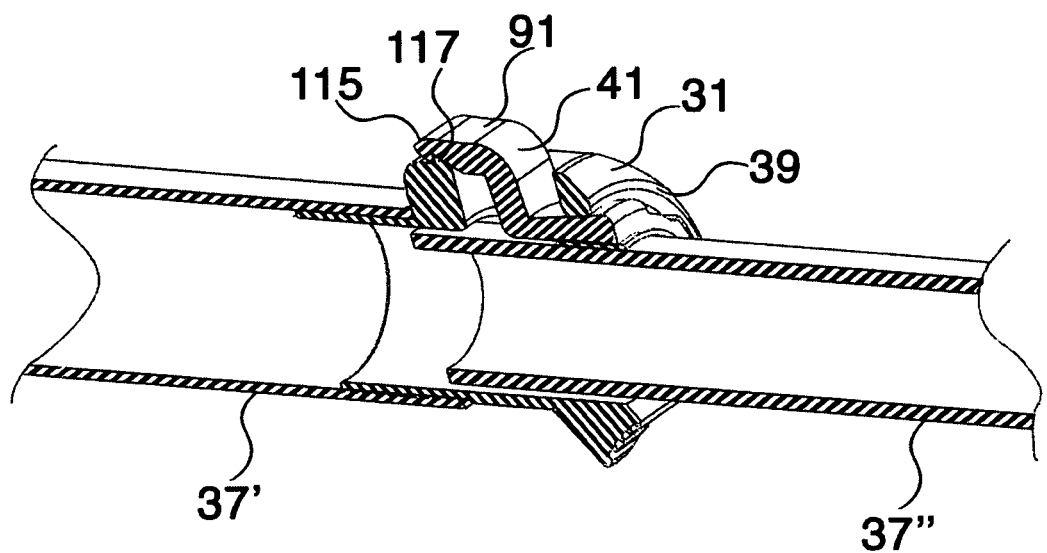
FIG. 14 is a sectional view of the embodiment of the coupler shown in FIG. 13.

The embodiment of coupler 31 shown in FIGS. 13 and 14 is likewise similar in most regards to the embodiment of FIG. 3. However, a semi-permanent locking feature requiring a tool such as a screwdriver to release coupler 31 is employed. Arm part 91 of arm 87 is configured with latching end 115. Ramp 116 and notch 117 are located at the bottom of carrier 31. As restraint 41 is dragged further into cavity 53 by axial movement of segment 37" as described hereinabove, latching end 115 ramps up and over ramp 114 into notch 117. This overrides the easy release feature described above which can be useful for fluid couplers and construction components.

Figure 15:
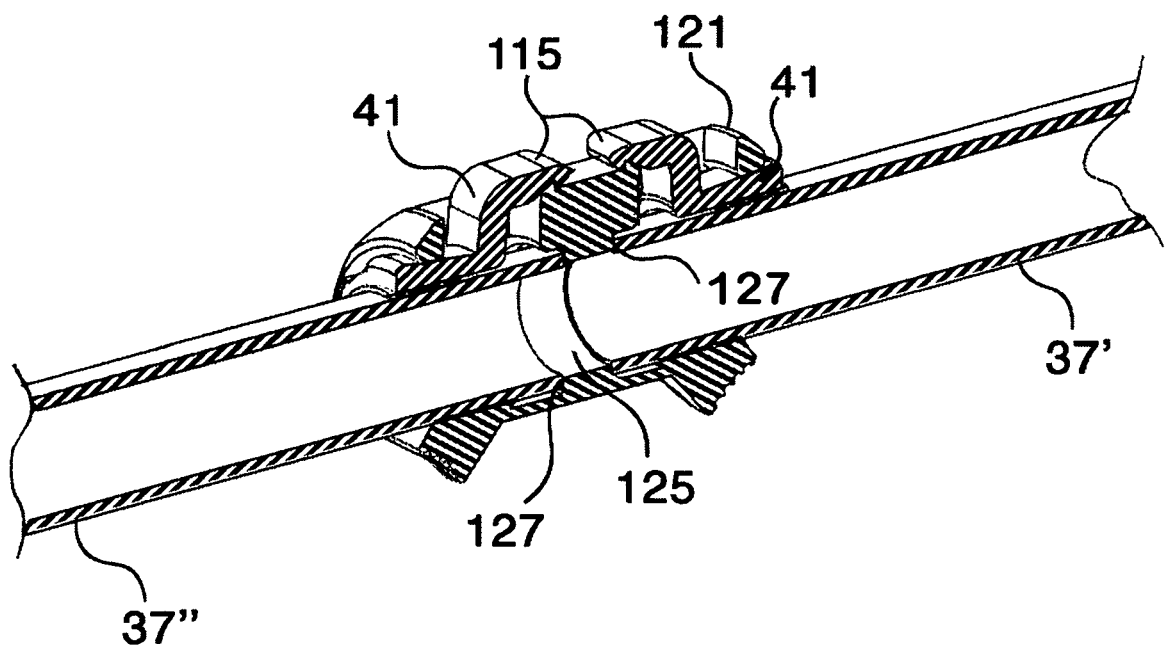
FIG. 15 is a sectional view illustrating adaptation of the embodiment of the coupler shown in FIG. 13 for use with butted segments of tubing of the same diameter.

A variation of the embodiment of FIGS. 13 and 14 is shown in FIG. 15 for use with butted segments 37' of the same diameter. This non-telescoping embodiment may be provided with the semi-permanent locking illustrated above. Coupler 121 includes double ended carrier 123, essentially two couplers in accord with the features of carrier 39 of coupler 31 positioned end to end in a unitary structure and each receiving restraints 41 for functionality as heretofore described. Each segment 37' is butted against carrier locating barrier 125 at shoulders 127 at opposite sides thereof. As the segment ends are inserted, restraints 41 grip the segments until latching ends 115 falls into place. This type of coupler would be used to unite tubing used to carry a fluid.

Moreover, a wide variety of this type of coupler could be designed within the scope of this invention, including cross-flow couplers, tees, elbow unions and the like.

Figure 16:
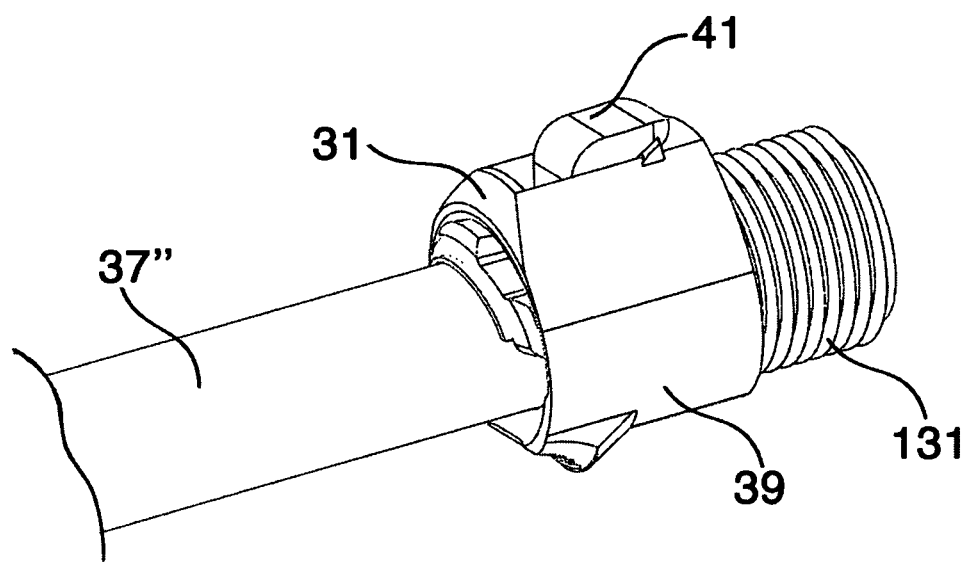
FIG. 16 is a perspective view of another alternative embodiment of the coupler of this invention.
Figure 17:
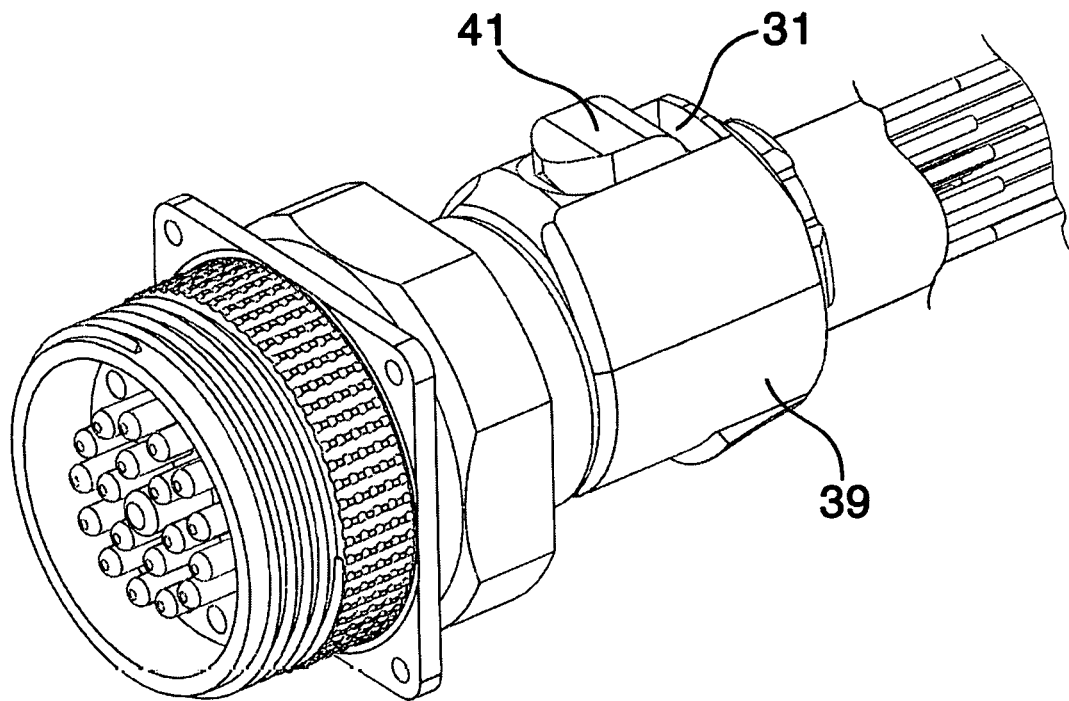
FIG. 17 is a perspective view of still another alternative embodiment of the coupler of this invention.

FIG. 16 illustrates an embodiment of coupler 31 wherein threaded sleeve 131 is utilized for connection to segment 37'. Various types of electrical connections could also be secured utilizing a non-telescoping design application as discussed above and as illustrated in FIG. 17. Carbon fiber tubing is available in a wide variety of geometric shapes. Therefore adaptability to these various shapes is desirable. In many cases the present coupler is easily adaptable to these various shapes with only minor modification of the inner geometry of carrier cavity 53 (as shown in FIG. 17) and/or inner surface 75/77 of restraint 41.

Figure 18:
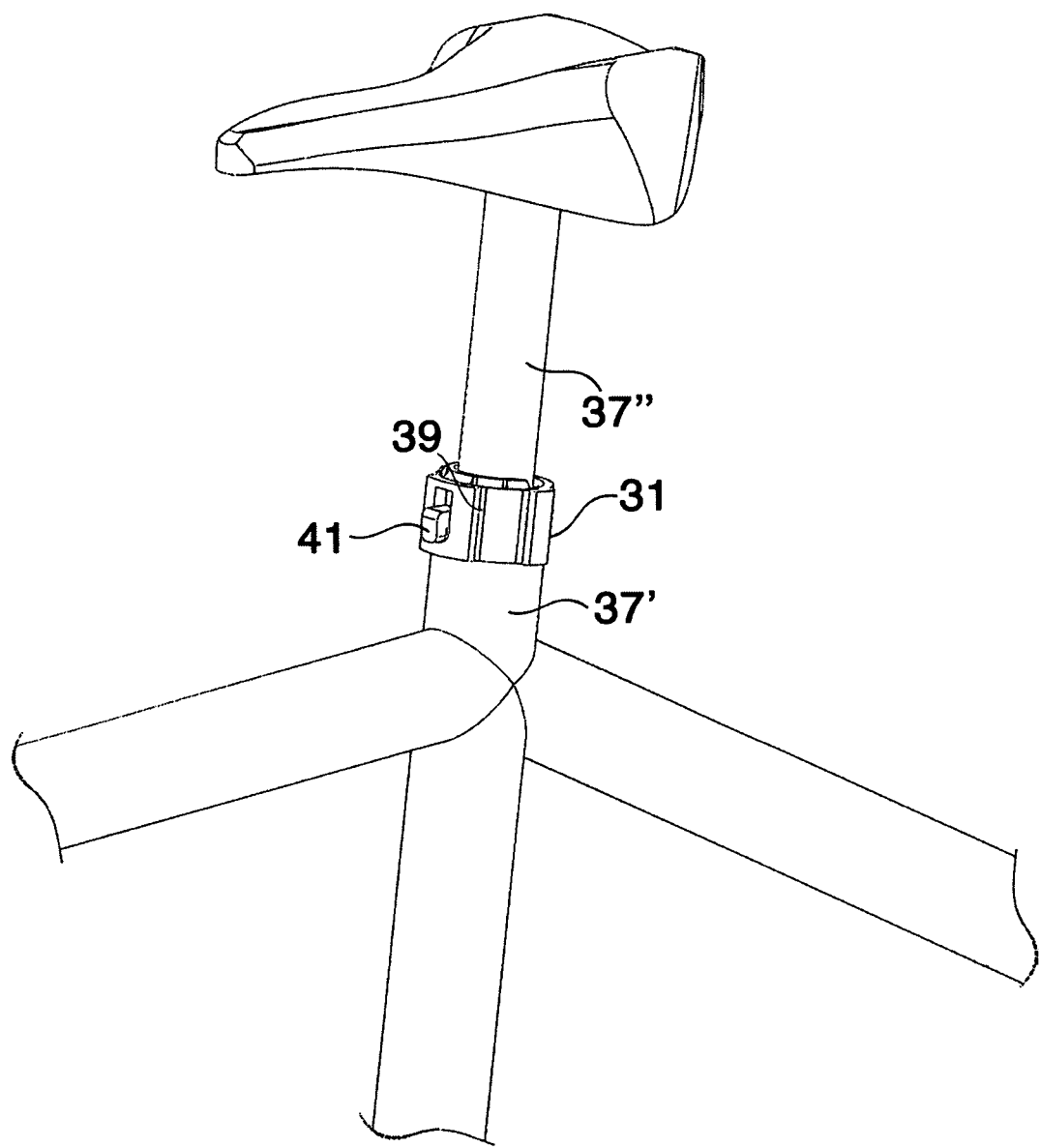
FIG. 18 is a perspective view illustrating adaptation of the coupler of this invention for engaging and securing a seat post in the seat tube of a bi- or tricycle.
Figure 19:
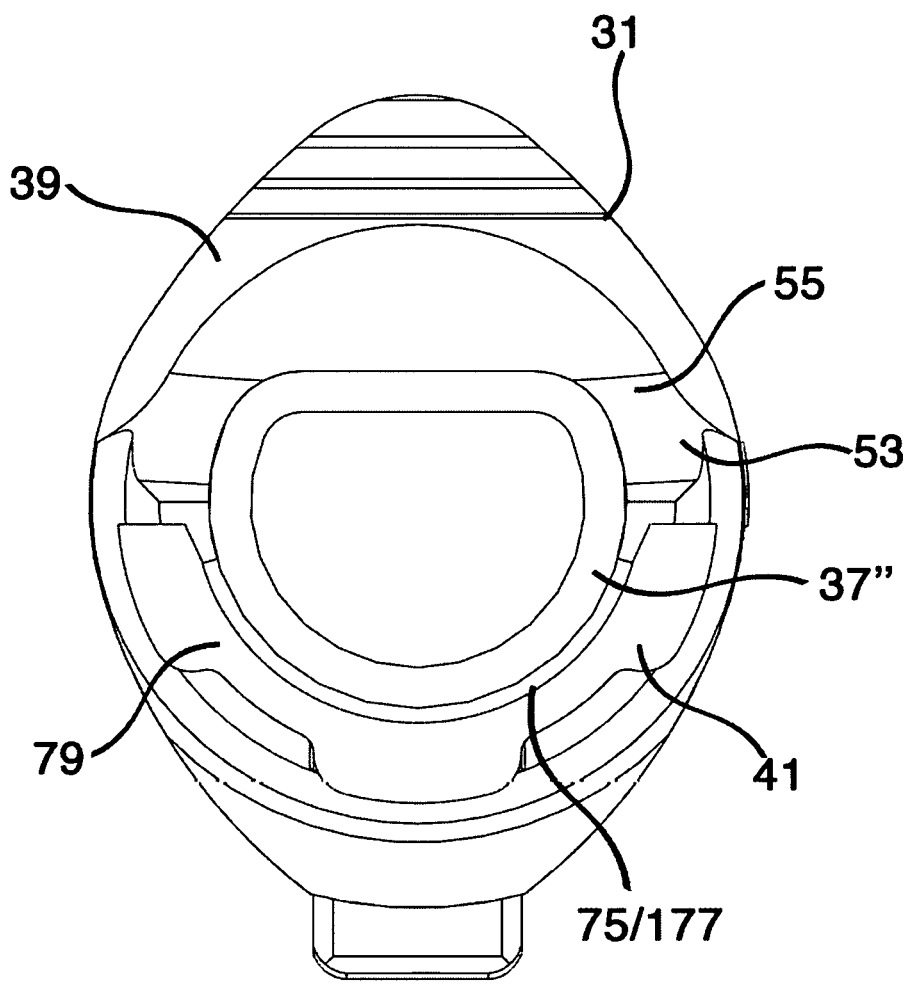
FIG. 19 is a sectional illustration showing an alternative geometry for the coupler of this invention.
Figure 20:
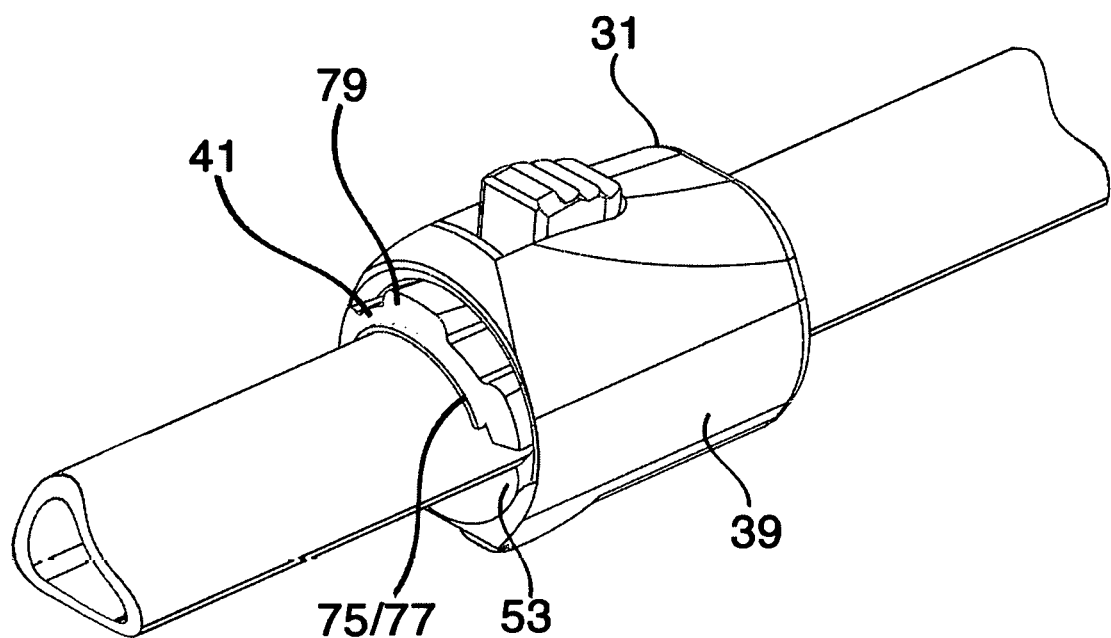
FIG. 20 is a perspective view illustrating another alternative geometry for the coupler of this invention.
Figure 21:
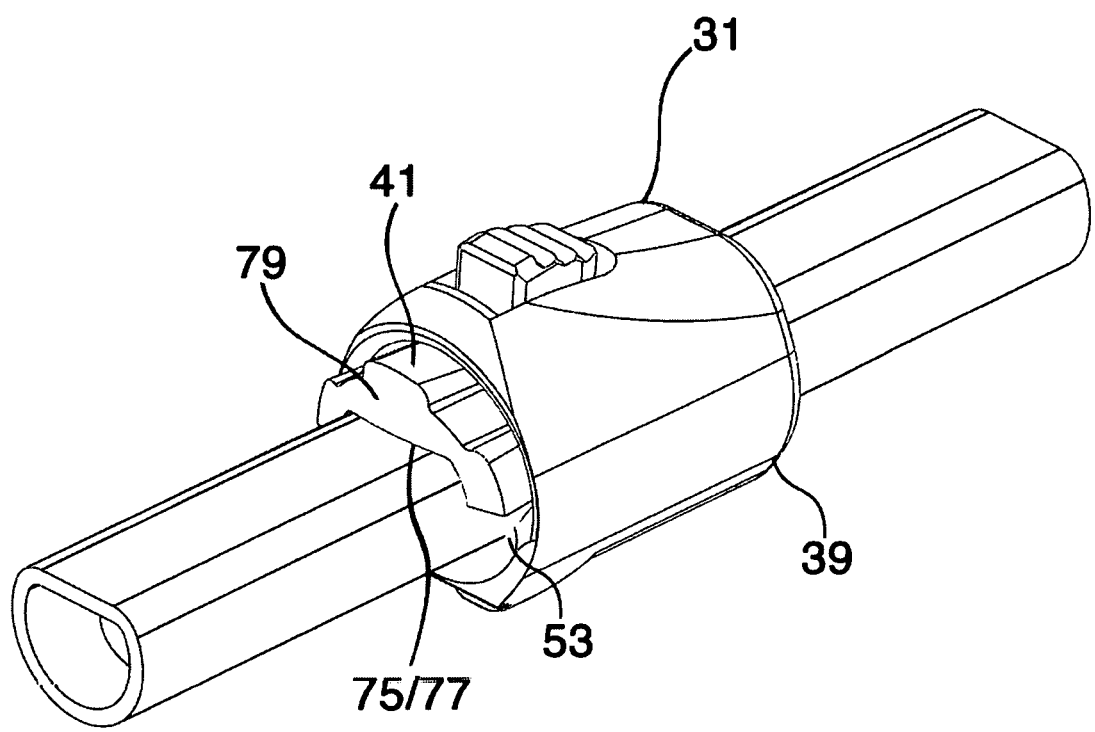
FIG. 21 is a perspective view of a yet another alternative geometry for coupler of this invention.

FIG. 18 illustrates use of coupler 31 adapted to retain bicycle seat stem (segment 37") at a selected location in a seat tube (segment 37'). Other adaptations and/or couplers employing alternative geometry are illustrated in FIGS. 19 to 21. FIG. 19 shows modification, particularly of the cavity wall of carrier 39, for application with "D" shaped tubing. Other geometric shaped tubing as shown in FIGS. 20 and 21 can as well be accommodated with minor adaptations of wall portion 55 of cavity 53 and or inner surface 75/77 of conic wedge 79. Many other geometric adaptations can be conceived utilizing the teaching hereinabove, such as hexagon, octagon, square and triangular profiles.

The coupler of this invention can be manufactured of plastic or carbon fiber material utilizing injection molding techniques. Other manufacturing methods could be used, including metal Injection molding, sintered metal, investment casting, CNC machining, 3D printing (metal as well as FDM/SLA), or the like.

What is claimed is:

1. A coupler for releasably securing first and second segments of an assemblage against otherwise accommodated relative translational displacement comprising:
    a carrier connectable at the first segment at one end thereof and having a passageway defined at said one end, said carrier characterized by an enlarged cavity therein open at an end of said carrier opposite said one end and having said passageway opening thereinto, said cavity having first and second wall portions, said first wall portion extending adjacent one side of said passageway and axially aligned with said passageway and said second wall portion spaced from said first wall portion and said passageway with an elongate opening defined therethrough opposite said first wall portion, said second wall portion extending a distance to said opposite end; and
    a wedge having an outer surface configured for slidable engagement at said second wall portion of said cavity of said carrier and having an inner surface configured for selective engagement with the second segment, an arm angularly extending from said outer surface of said wedge and receivable through said elongate opening through said second wall portion of said cavity of said carrier and slidable therein.

2. The coupler of claim 1 wherein said arm includes first and second angularly extending parts.

3. The coupler of claim 1 wherein said cavity includes and inwardly tapering lip adjacent to said opposite end and said first wall portion and an outwardly protruding gripping surface adjacent to said lip.

4. The coupler of claim 1 wherein a cumulative cone angle is established by any one, two, three or all of said outer surface of said wedge, said inner surface of said wedge and said cavity wall portions of said carrier in a range of between 2° to 16°.

5. The coupler of claim 1 wherein said carrier includes a connecting sleeve having said passageway therethrough for receiving and securing the first segment, said connecting sleeve configured as any of a sleeve for receiving the first segment therein, a sleeve receivable in the first segment, a threaded fitting, and an electrical fitting.

6. The coupler of claim 1 wherein said carrier further includes a second cavity adjacent to said enlarged cavity, a barrier having shoulders at each side thereof dividing the cavities and having a passageway therebetween and each for receiving a different one of the segments, said second cavity having first and second wall portions, said first wall portion extending adjacent one side of said passageway and axially aligned with said passageway and said second wall portion spaced from said first wall portion and said passageway with an elongate opening defined therethrough opposite said first wall portion; and wherein a second wedge having an outer surface configured for slidable engagement at said second wall portion of said second cavity of said carrier and having an inner surface configured for selective engagement with a segment thereat, an arm angularly extending from said outer surface of said second wedge and receivable through said elongate opening through said second wall portion of said second cavity of said carrier and slidable therein;

wherein said first and second segments are thus butted end to end.

7. The coupler of claim 1 further comprising a latch at said arm of said restraint.

8. A coupler for coupling integrated first and second segments of an assemblage, each segment having an end portion engagable with one another, the apparatus releasably securing the segments against relative movement therebetween in at least one axial direction, said coupler comprising:

a carrier connectable at one end thereof adjacent to the end portion of the first segment and having a passageway defined at said one end accommodating slidable receipt therethrough of the end portion of the second segment, said carrier characterized by an enlarged cavity therein open at an end of said carrier opposite said one end and having said passageway opening thereinto, said cavity having first and second wall portions, said first wall portion configured with a portion linearly aligned with one side of said passageway and said second wall portion spaced from said first wall portion and said passageway and having an elongate slot defined therethrough between said one end and said opposite end and opposite said first wall portion, said elongate slot having an inwardly facing opening of a first length and an outwardly facing opening longer than said first length adjacent to said opposite end, an arcuate guide surface defined therebetween adjacent to said opposite end; and a restraint having an outer surface configured for slidable engagement at said second wall portion of said cavity of said carrier and having an inner surface adapted for frictional engagement with the second segment, said surfaces together defining a conic wedge with upper and lower ends, an actuator arm angularly extending from said outer surface at said lower end of said restraint and receivable through said elongate slot through said second wall portion of said cavity of said carrier, said arm having a first part slidable in said cavity when assembled and a second part spaced from said conic wedge and angularly extending from said first part to contact and engage said guide surface of said elongate slot, said second part readily accessible to a user for manipulation of the segments.

9. The coupler of claim 8 wherein inner surface of said conic wedge includes a semi-pliant substrate surface positioned thereat.

10. The coupler of claim 8 wherein a cumulative cone angle is established by any one, two, three or all of said outer surface of said restraint, said inner surface of said restraint and said cavity wall portions of said carrier in a range of between 2° to 16°.

11. The coupler of claim of 10 wherein said is preferably between about 4° and 6°.

12. The coupler of claim 8 wherein a connecting sleeve for securement at the first segment is located at said one end of said carrier.

13. The coupler of claim of 12 wherein said connecting sleeve is adapted to receive the one end portion of the first segment either thereover or therein.

14. An apparatus for coupling integrated first and second telescoping segments of an assemblage, each segment having a cylindrical end portion telescopingly engagable with one another, the apparatus releasably securing the segments against relative movement therebetween in one direction, said apparatus comprising:

a carrier affixable at one end thereof to the end portion of the first segment and having a cylindrical passageway at said one end accommodating slidable receipt therethrough of the end portion of the second segment, said carrier characterized by an enlarged cavity therein open at an end of said carrier opposite said one end and having said passageway opening thereinto adjacent to said one end thereof, said cavity having a first radial wall portion thereat axially aligned at a juncture with said cylindrical passageway and having a common radius at said juncture with said cylindrical passageway, said first wall portion extending a distance between said ends, a second radial wall portion located in said cavity opposite said first wall portion and having a radius longer than said first wall portion, said second wall portion extending a distance to said opposite end and having an elongate opening therethrough opposite said first wall portion; and a restraint including a conic wedge with upper and lower ends, said conic wedge having outer surfaces circumferentially defined therearound configured for slidable engagement at said second wall portion of said cavity of said carrier and having an inner surface with a selected radial configuration, said restraint including an actuator arm angularly extending from said outer surface at said lower end of said conic wedge and receivable through said elongate opening through said second wall portion of said cavity of said carrier, said arm having a first part slidable in said cavity when assembled and a second part spaced from said conic wedge and angularly extending from said first part, said arm readily manipulable by a user.

15. The apparatus of claim 14 wherein said second part of said arm includes a latch and wherein said carrier includes a ramp and a notch below said elongate opening, said notch configure to receive and retain said latch.

16. The apparatus of claim 14 wherein said inner surface of said restraint includes a frictional surface applied thereon.

17. The apparatus of claim 14 wherein said second part of said actuator arm includes a latch at an end thereof.

18. The apparatus of claim 14 wherein said outer surfaces of said conic wedge include skids circumferentially arranged about said wedge.

19. The apparatus of claim 14 wherein a cumulative cone angle is established by any one, two, three or all of said outer surface of said restraint, said inner surface of said restraint and said cavity wall portions of said carrier between about 4° and 6°.

20. The apparatus of claim 14 further comprising a protruding gripping surface at said opposite end of said carrier.

* * * * *